United States Patent [19]

Foster

[11] Patent Number: 5,623,998
[45] Date of Patent: Apr. 29, 1997

[54] BEARING ASSEMBLY FOR A LEVELING HARROW

[75] Inventor: Philip W. Foster, Lee, Ill.

[73] Assignee: Farmers' Factory Co., Lee, Ill.

[21] Appl. No.: 584,063

[22] Filed: Jan. 11, 1996

[51] Int. Cl.⁶ .......................... A01B 21/04; A01B 23/00
[52] U.S. Cl. .......................... 172/548; 172/549; 384/275
[58] Field of Search ........................ 172/456, 540, 172/548, 549, 550, 551, 543, 570, 705, 707; 384/272, 275, 276, 296

[56] References Cited

U.S. PATENT DOCUMENTS

| | | | |
|---|---|---|---|
| 608,398 | 8/1898 | Baker | 384/275 |
| 614,601 | 11/1898 | Baker | 384/275 |
| 2,881,847 | 4/1959 | Strasel | 172/549 X |
| 3,438,686 | 4/1969 | Stone | 384/296 |
| 4,384,643 | 5/1983 | Cone | 384/258 X |
| 4,658,910 | 4/1987 | Garriss | 172/548 X |
| 5,158,145 | 10/1992 | Karchewski | 172/548 |
| 5,385,422 | 1/1995 | Kruger | 384/275 X |

Primary Examiner—Terry Lee Melius
Assistant Examiner—Robert Pezzuto
Attorney, Agent, or Firm—Leydig, Voit & Mayer, Ltd.

[57] ABSTRACT

A harrow includes a series of sleeves each having a plurality of teeth and telescoped non-rotatably over a rod which is rotatably journaled by laterally spaced bearing assemblies supported by mounting arms which, in turn, are attached to a tool bar. The bearing assemblies include an outer bearing and a generally cylindrically-shaped collar having a circular outer perimeter and a split extending longitudinally along the collar. The collar defines an inner perimeter disposed to receive the elongated rod. At least one radially directed pilot hole for receiving a set screw is formed through each collar. A set screw is threaded through the pilot hole and may be rotatably advanced therein to abut the elongated rod. Reactionary force from the abutment expands the collar at the split to positively engage the outer perimeter of the collar with the outer bearing. The bearing assemblies facilitate rotation of the toothed rod, which rolls over the ground to pulverize and level the soil as the tool bar is pulled forwardly.

10 Claims, 3 Drawing Sheets

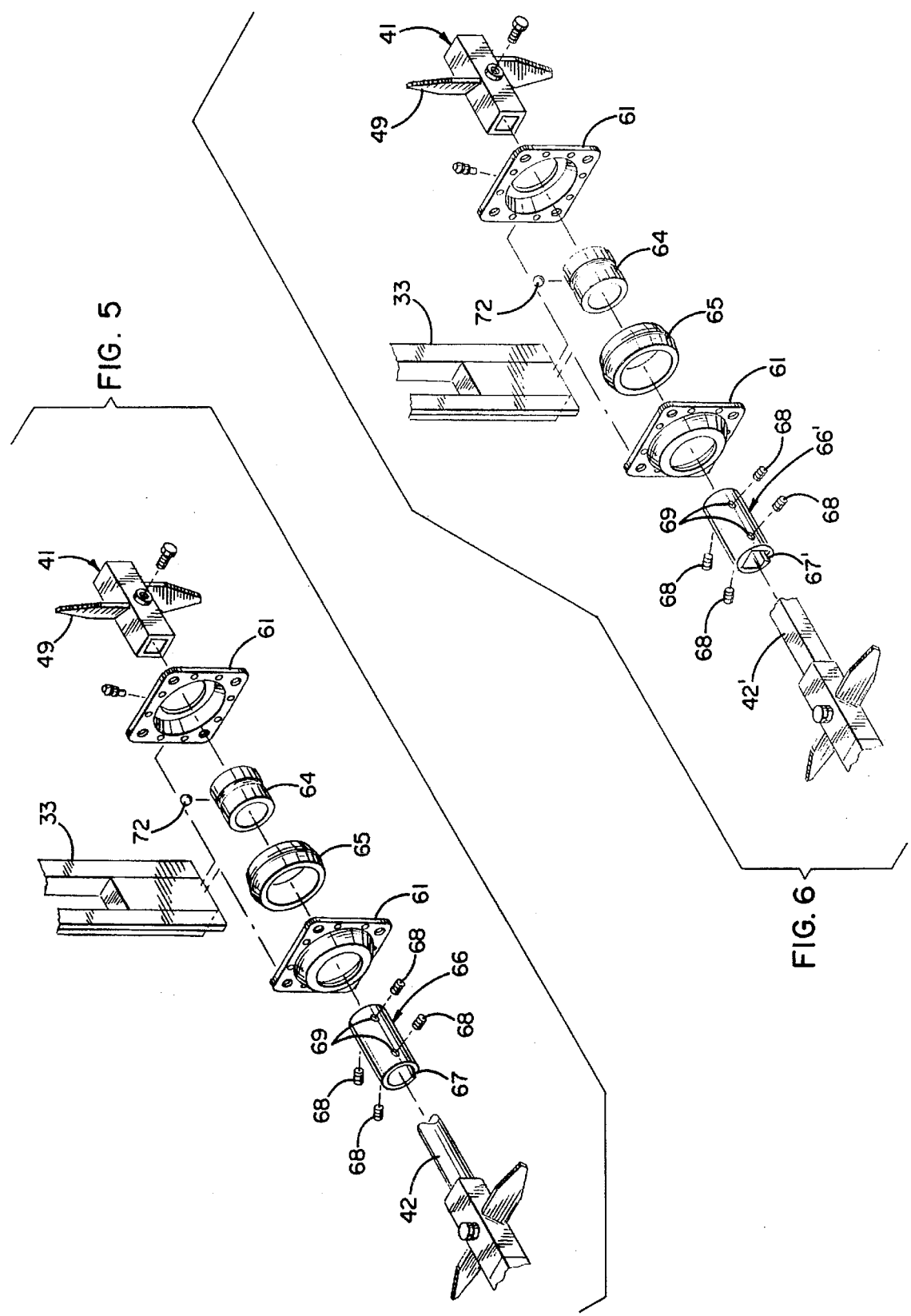

5,623,998

BEARING ASSEMBLY FOR A LEVELING HARROW

FIELD OF THE INVENTION

The present invention relates generally to farm implements for leveling ground and, more particularly, to a bearing assembly for rotatably supporting a laterally extending elongated rod having a plurality of toothed segments.

BACKGROUND OF THE INVENTION

Harrows are well known farm instruments used for working and leveling the ground, and may be attached to and pulled by a plow or other cultivating implement. Alternatively, they may simply be attached to a tool bar and pulled through a previously tilled field.

A very commercially successful harrow is disclosed in U. S. Pat. No. 3,991,831 to Foster. That harrow includes an elongated leveling rod having a series of angled teeth which are urged into the ground in order to break up and pulverize clods and smaller chunks of earth into loose soil. The leveling rod is attached to the lower ends of mounting arms which are adapted to be connected to the tool bar or to the rear beam of the leading implement.

While the harrow of the Foster patent functions well in plowed and relatively loose ground, it is less satisfactory when used to level minimally tilled soil. Trash and residue left from the previous year's harvest tend to build up between and in front of the teeth, and prevent the teeth from breaking through the crust and leveling the soil.

To address these shortcomings, Phillip Foster (inventor of the harrow of the '831 patent) invented an improved leveling harrow having angled teeth carried on a rotatably supported rod. Rotation of the rod keeps residue from accumulating between the teeth and thus improves performance of the leveling harrow. This improved harrow is more fully described in commonly assigned U.S. patent application Ser. No. 08/261,391, filed on Jun. 17, 1994. As described therein, the angled teeth are disposed on segments that are telescoped nonrotatably over the elongated rod, which in turn is journaled by laterally spaced bearings supported by mounting arms. An advantage of the toothed segments is that variable length leveling rods are readily fabricated by telescoping more or fewer toothed segments on the rod.

While the leveling harrow disclosed in the '391 application provides an effective solution to the prior art problems discussed therein, other improvements are desired. More specifically, it has been found that installation of the elongated rod onto the ground working implement is sometimes exceedingly time consuming, particularly with longer rod lengths. The rod is installed by aligning it with the laterally spaced bearings and inserting it therethrough (installing the toothed segments therewith). Press fitting bearings along the length of the long rod, particularly if it is not completely straight, can present substantial difficulty. It has been found that, for various reasons including variations in mechanical tolerances, perfect alignment of the rod and bearings is not achieved. As a result, the rod often binds within the bearings, making installation of the rod more difficult and time consuming.

SUMMARY OF THE INVENTION

Accordingly, the general aim of the present invention is to provide an improved bearing assembly for rotatably supporting an elongated rod such as in a farming harrow.

A more specific object of the present invention is to provide an improved bearing assembly that facilitates the installation of an elongated rod that carries a plurality of toothed segments for working the ground, by reducing the binding that occurs when the bearings do not perfectly align.

Thus, a related object of the present invention is to provide an improved bearing assembly for rotatably supporting a farming harrow, that accommodates greater variation in mechanical tolerances.

These and other objects and advantages of the invention will become apparent to those skilled in the art upon examination or the following description when taken in conjunction with the accompanying drawings.

To achieve the foregoing and other objects, the present invention is generally directed to a bearing assembly for rotatably supporting an elongated rod, for example, in a ground working implement. The bearing assembly includes a housing having a laterally disposed bore for receiving the elongated rod. A ball bearing is seated within the laterally disposed bore and defines an inner race and an outer race. The outer race is seated within the lateral bore to maintain a stationary relationship therewith. The bearing assembly also includes a generally cylindrically-shaped collar concentrically disposed between the rod and the bearing, and having a circular outer perimeter for engaging the bearing inner race. The collar is split lengthwise, and defines an inner perimeter that receives the elongated rod and at least one radially directed pilot hole for receiving a set screw. The set screw is threadably inserted to engage the pilot hole, and is rotatably advanced therein to abut the elongated rod. Reactionary force from the abutment is translated through the threaded engagement to expand the collar at the split to positively engage the outer perimeter of the collar with the inner race of the bearing.

BRIEF DESCRIPTION OF THE DRAWINGS

FIG. 5 is an exploded perspective view of a bearing assembly that supports the rod of the harrow; and FIG. 6 is a view similar to FIG. 5 but shows a modified version of the rod.

Figure 1:
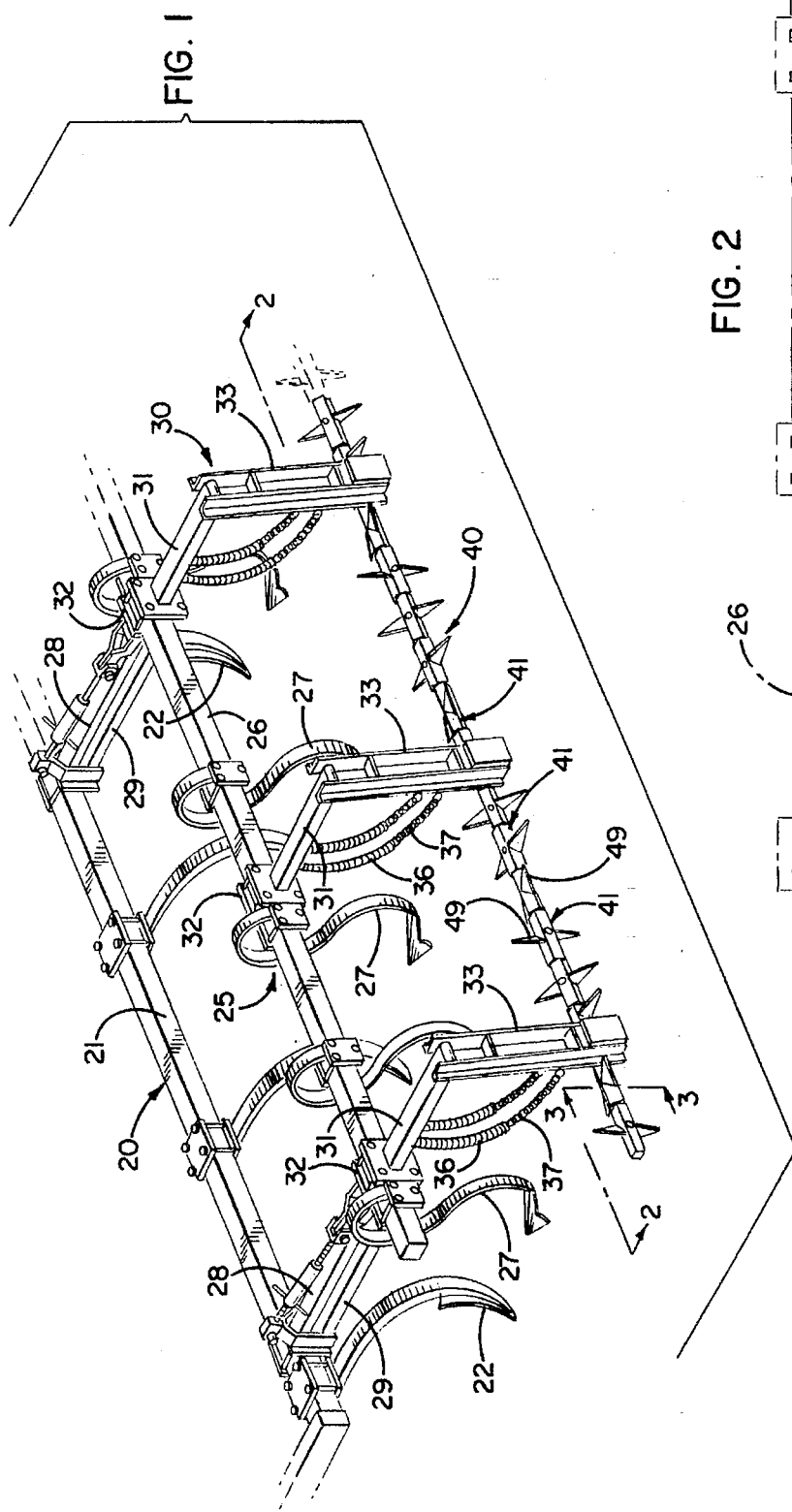
FIG. 1 is a rear perspective view of a typical ground leveling implement equipped with a harrow preferably used in connection with the present invention.

While the invention is susceptible of various modifications and alternative constructions, certain illustrated embodiments hereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention.

DETAILED DESCRIPTION OF THE PREFERRED EMBODIMENTS

Referring now to the drawings, FIG. 1 illustrates the present invention in conjunction with a ground tillage implement such as a chisel plow 20 adapted to be pulled forwardly across a field by a tractor (not shown). The plow includes a rear beam 21 which carries several laterally spaced shovels 22.

In this particular instance, a second implement 25 has been shown as connected to and trailing the plow 20. The implement includes a beam or tool bar 26 which carries several laterally spaced and generally S-shaped tines 27. The tines are made of spring steel and serve to split in half the ridges left by the shovels 22. The tool bar 26 is connected to the beam 21 by two laterally spaced sets of upper and lower parallel links 28 and 29.

A harrow 30 is attached to and trails the tool bar 26 and serves to knock off the tops of the ridges and level the field. In the event the implement 25 is not used, the harrow may be attached directly to the beam 21 of the plow 20 or to a tool bar connected directly to the tractor.

Herein, the harrow 30 includes three laterally spaced mounting arms 31 which are secured to and project rearwardly from the tool bar 26, the mounting arms being secured rigidly to the tool bar by U-bolt/plate clamps 32. The upper end portions of two brackets or swing arms 33 straddle the rear end portion of each mounting arm 31 and are pivotally secured thereto by a bolt which permits the swing arms to pivot upwardly and downwardly, and may be adapted, for example, by means of vertically spaced holes in the swing arms, to enable adjustment of the height of the swing arms. For a purpose to be described subsequently, two contractile springs 36 are connected to the forward end portion of each mounting arm 31 and are connected by chains 37 to the lower end portions of the swing arms 33.

Carried on the lower end portions of the swing arms 33 is a laterally extending leveler 40 which serves to knock off the tops of the ridges and work the field to a level condition. Preferably, the leveler is formed by a segmented series of rotatable toothed units 41 which aggressively work the ground without being clogged by trash or the like, and which enable the mounting arms 31 to be located laterally on the tool bar 26 in such positions as necessary to accommodate the particular characteristics of the tool bar.

In the preferred embodiment, the leveler 40 includes an elongated cylindrical rod 42 (FIGS. 3–5) which is rotatably journaled at three laterally spaced locations by bearing assemblies 60 supported by the lower end portions of the three sets of swing arms 33. The leveler 40 includes a plurality of toothed segments 41, each of which comprises a relatively short sleeve (e.g., 6" long) telescoped over the rod 42 and secured against rotation and translation relative thereto by an anchoring screw. Each sleeve preferably is formed by a section of steel tubing having square internal and external cross-sectional shapes. Preferably, two teeth 49 are welded to flat diametrically opposite sides of each sleeve and project in opposite directions therefrom, with the teeth 49 of each sleeve being oppositely pitched.

Figure 2:
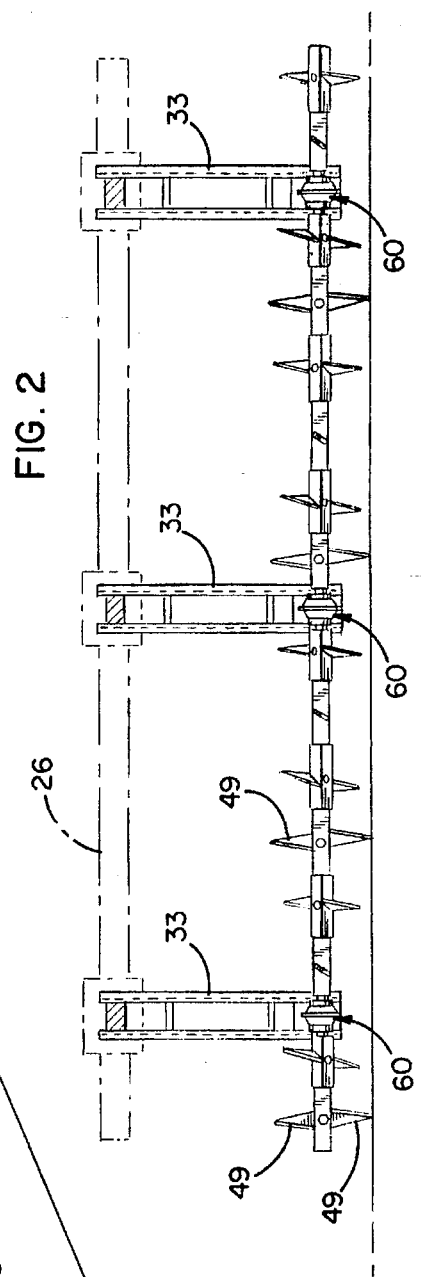
FIG. 2 is a rear elevation of the implement and the harrow as seen along the line 2—2 of FIG. 1.

In the preferred embodiment as shown in FIGS. 1 and 2, the teeth 49 are arranged to roughly approximate a helix along the shaft 42. For example, choosing one of the teeth at the left of the rod and moving rightward, it will be seen that each tooth pair advances by about 45° from the prior pair such that there is a repeating sequence based on groups of four orientation (e g., 0°, 45°, 90°, 135°, 0°, etc). It can be imagined that with the implement pulled along the ground, the rod rotates, and the teeth engage the ground moving along the rod as the roughly defined helix rotates. Other tooth orientations can be used, of course, but the 45° degree advancement, which is readily accomplished in the embodiment of FIG. 1, is currently preferred.

In greater detail, when the harrow 30 is pulled forwardly, the teeth 49 engage the ground and resist forward movement of the rod 42. As a result, the swing arms 33 tend to pivot upwardly or rearwardly and stretch the springs 36. As the harrow travels forwardly, the springs urge the swing arms 33 downwardly so as to press the teeth 49 into the ground. The resistance which the teeth encounter causes the teeth to rotate with such rotation being permitted by the bearing assemblies 60 which support the rod 42. As a result, the teeth 49 penetrate the soil and break up and pulverize clods while leveling the tops of the ridges. Because the teeth 49 rotate, field residue and trash does not tend to build up in front of or clog between the teeth but instead passes through the teeth so as to leave the teeth free to effectively pulverize the earth.

Figure 3:
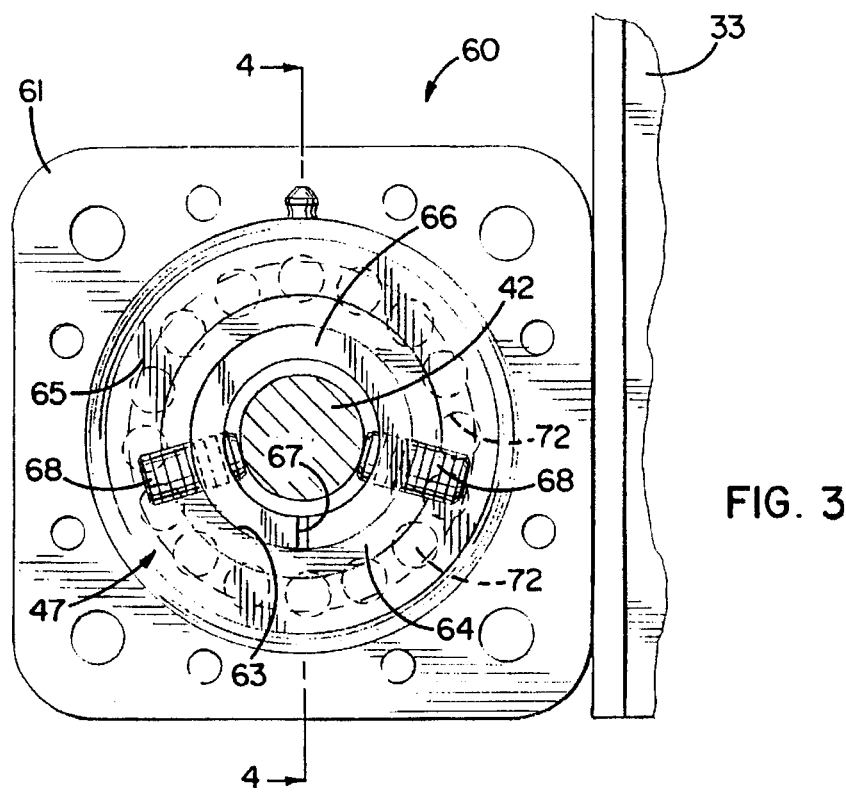
FIG. 3 is an enlarged fragmentary side elevation of the implement and illustrating a bearing assembly as seen along the line 3—3 of FIG. 1.

In accordance with the present invention, an improved bearing assembly 60 is provided for rotatably supporting the elongated rod 42. More particularly, the present invention is directed to a bearing assembly 60 that facilitates installation of the elongated rod 42 by providing a space concentrically between a bearing 47 and the rod 42 (FIG. 3). This small space provided between the bearing assembly and the rod allows the bearing assembly to be slipped onto the rod (as opposed to press fit) much as the toothed segments are installed. The bearing assembly also provides for axially fixing the bearing in position, along the rod, just as the toothed segments are also axially fixable. As will become more apparent, this eliminates the problem of attempting to press a tightly fitting bearing over an elongate length of shaft which has possibly been bent during use, which can become a tedious operation.

As a further advantage, the bearing itself is a relatively inexpensive ball bearing, which can be somewhat oversized as related to the shaft diameter. The normal ball bearing will closely fit the shaft, and may be secured by set screws, for example, for a tight tolerance fit and good concentricity. However, in connection with the harrow implementation, adequate concentricity can be achieved and assembly very significantly simplified by use of the bearing assembly now to be described.

Figure 4:
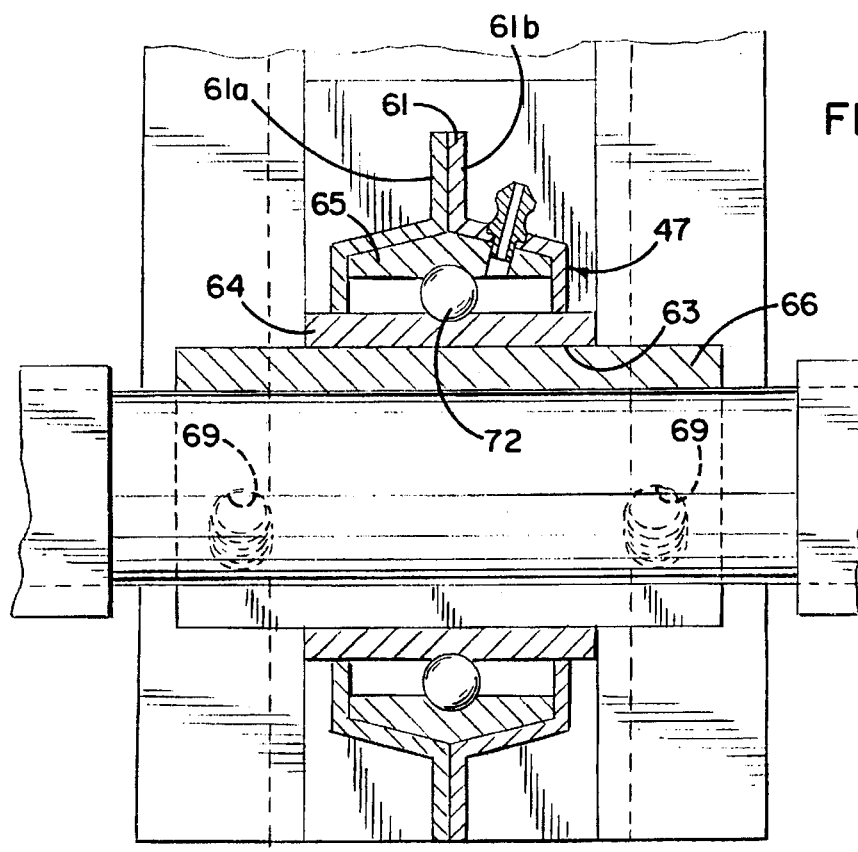
FIG. 4 is an enlarged fragmentary cross-section taken substantially along the line 4—4 of FIG. 3.

Referring to FIGS. 3 and 4, each bearing assembly 60 includes a housing 61 that is carried on the swing arm 33. Preferably, the housing 61 is bolted to form a rigid attachment to the swing arm 33. The housing 61 receives the bearing 47, which is preferably a conventional ball bearing, having an inner race 64 and an outer race 65, and a circular train of bearings 72 caged therebetween, to provide low frictional relative movement between the inner and outer races.

The outer race 65 of the bearing 47 is seated within the housing 61 in stationary or fixed relation therewith. It will be seen in FIG. 4 that the housing 61 is made up of two sections 61a and 61b, which are spot welded together after the bearing is positioned between the two halves. The inner race 64 of the bearing 47 defines a cylindrical bore 63 for receiving the rod 42. Concentrically sandwiched between the rod 42 and the bearing 47 is a sleeve or collar 66. Preferably, the collar 66 is cylindrically-shaped and, for reasons described below, is dimensioned to extend beyond the end of the bearing 47. A split 67 extends along the length of the collar 66 to permit diametric expansion and contraction of the collar 66 when installing the rod 42. In this regard, it is preferred that the collar 66 fit loosely between the bearing 47 and the rod 42. With a loose fit, the three elements, rod 41, collar 66 and bearing 63 can be assembled simply by sliding those elements together, since the inner diameter of the inner race of the bearing is sufficiently large for sliding engagement with the collar, and the collar when expanded has a sufficiently large inner diameter for sliding fit with the rod. This simple assembly should be contrasted with the previously required press fitting of the inner race onto the shaft along a substantial portion of its length. After the elements are properly located with respect to each other, the collar is then expanded in such a way as to (a) fix the collar to the shaft and (b) securely engage the outer periphery of the collar with the inner race of the bearing. A secure bearing fit will then be achieved, which will allow the rod to rotate in the bearing and the harrow to function as a harrow.

In the illustrated embodiment, radially directed pilot holes 69 are disposed near the lateral ends of the collar 66, and outside the lateral ends of the bearing 47. Set screws 68 rotatably inserted into the pilot holes 69 are advanced until a first or leading end abuts the rod 42. Further positive rotation of the set screws 68 results in a reactionary force translated through the set screws 68, which, due to the threaded engagement between the set screws 68 and the pilot holes 69, causes the collar 66 to expand along the split 67. The set screws 68 thus non-rotatably secure the collar 66 to the rod 42, and the expanding action of the collar 66 binds the collar 66 tightly within the inner race 64 of bearing 47. In this way the inner race 64 of bearing 47 rotates with the rod 42, as it is pulled over the ground. Although not shown in the drawings, it is found desirable to include a shoe under each bearing assembly, when the bearings are used on a rod in a rotary harrow. In that application, the bearings will run in the soil, and the provision of a shoe to prevent soil or other debris from entering the bearing will materially extend the life of the apparatus.

As alluded to earlier, a significant advantage of the toothed segments 41 is that the segments may be used to fabricate a leveler 40 of varying lengths. Thus, segments 41 of the same type may be used to build a leveler ranging, for example, from 4' to 13' simply by using a rod 42 of appropriate length and by equipping the rod with the necessary number of segments. Moreover, the segments may be positioned so as to allow mounting of the swing arms 33 at any required location along the rod 42. This is achieved simply by separating two adjacent segments from one another along the rod as necessary to create a space for the bearing 47 of the swing arm 33. In this way, the swing arms may be connected to the rod 42 at lateral locations dictated by the requirements of the particular tool bar 26 (e.g., by the lateral placement of the tines 27 on the tool bar) so that the mounting arms 31 may be located at available positions along the tool bar. In the illustrated embodiment, the rod 42 is supported by three sets of mounting arms 31 and swing arms 33. Alternatively, the leveler 40 may be supported by two sets of mounting arms in the case of a shorter leveler, or may be supported by four or more sets in the case of a longer leveler. The advantages of the present invention become particularly apparent in the embodiments of longer levelers having additional mounting arms. More specifically, as the leveler length increases, tolerance spreads become more acute. Thus, the concentric space provided at the bearing collars 66 become increasingly advantageous.

Installation of the toothed rod onto the illustrated ground working implement is achieved as follows. The rod 42 is aligned with a first or end bearing assembly 60 (FIG. 2), and inserted therethrough. Then a predetermined number of toothed segments 41 (six in the illustrated embodiment) are telescoped over the rod 42. The toothed segments can then be fixed in relative angular position. In the preferred practice of the invention, using square shaft tooth segments, and a round internal shaft 42, the segments are oriented at 45° with respect to each other, so that the segment orientation repeats every fifth segment. As will be described below, using a square shaft, the segments are oriented at 90° with respect to each other, in effect, in alternating orientations. The rod is then inserted through the next (center) bearing assembly 60 and a collar 66 is slid over the rod 42 and into that (center) bearing 47. Again, a predetermined number (six) of toothed segments 41 are telescoped over the rod 42 and aligned. The rod 42 is then inserted through the last bearing 47. Collars 66 are then inserted into the end bearing assemblies 60. To complete the installation, set screws 68 in the respective pilot holes 69 of the bearing assemblies 60 are tightened to secure the collars 66 between the rod 42 and the bearings 47. Toothed segments may be installed on the two outboard end portions of the rods either before or after tightening of the set screws. The assembled rod can then be mounted to the swing arms 33, by bolting the bearing assemblies thereto. Any misalignment which had occurred during assembly of the elements on the rods is easily corrected by simply loosening the appropriate set screws and moving the elements into the desired location. The bearings can be moved axially as readily as can be the toothed segments.

It will be further appreciated that a similar installation procedure will be undertaken for longer or shorter rods 42, having additional or fewer swing arms 33.

A modified version of a leveler is shown in FIG. 6 and differs primarily from the previously described leveler in that the rod 42' of the leveler has the same rectangular cross-section as the sleeves 41. In this embodiment, the collars 66' have square openings for receiving the rod. More specifically, in this embodiment, the inner perimeter of the bearing collar 66' has a rectangular cross-section that substantially conforms to the rod 42'.

As a result of the square cross-sectional shape of the rod 42' the sleeves 41 are automatically held against rotation on the rod and thus every sleeve need not be equipped with a tapped collar and an anchoring screw (although anchoring screws are illustrated). In many cases, only the sleeves at the extreme ends of the rod need be provided with set screws for preventing the sleeves from sliding off of the rod. The square rod 42' is disadvantageous, however, in that adjacent teeth 49 cannot be spaced angularly from one another by a distance less than 90 degrees.

The foregoing description of various preferred embodiments of the invention has been presented for purposes of illustration and description. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

I claim:

1. A harrow adapted to be towed forwardly by a tool bar comprising:

an elongated and laterally extending rod having a plurality of sleeves telescoped onto and secured to said rod in first and second groups of abutting sleeves, each of the sleeves having a plurality of angularly spaced teeth for working the ground;

adjacent sleeves of the first and second groups of sleeves being separated laterally from one another along the rod whereby first and second spaces are defined between the sleeves of the first and second groups, respectively;

first and second bearing assemblies disposed in the first and second spaces, respectively, and rotatably supporting the rod; each bearing assembly including a bearing having an inner and an outer race, a split collar concentrically positioned between the inner race of the bearing and the rod, and means locking the split collar to the rod and expanding the split collar to engage the inner race of the bearing thereby to non-rotatably connect the inner race of the bearing to the rod; and means connected to and extending upwardly from the bearing assemblies for supporting the bearing assemblies and for connecting the bearing assemblies and the rod to the tool bar.

2. The harrow as defined in claim 1, wherein the collar of each bearing assembly is generally cylindrical and includes a circular outer perimeter, a split extending longitudinally along the collar, the collar having an inner perimeter disposed to receive the elongated rod and at least one radially directed pilot hole, a set screw threadably engaging the pilot hole and rotatable therein to abut the elongated rod whereby reactionary force from the abutment is translated through the threaded engagement to expand the collar at the split and positively engage the outer perimeter of the collar with the inner race of the bearing.

3. A bearing assembly for rotatably supporting an elongated rod comprising:

a housing;

a bearing having an inner race and an outer race, the outer race being seated within the housing to maintain a stationary relationship therewith, a train of balls caged between the inner and outer races; and a generally cylindrically-shaped collar having a split extending longitudinally along the collar, at least one generally radial threaded pilot hole near the split, and a set screw in threaded engagement in the pilot hole; the elongated rod slidably fitting into an inner bore of the collar, and the collar fitting within the inner race of the bearing, the set screw being rotatable to engage the shaft whereby reactionary force from contact with the shaft is translated through the threaded engagement to expand the collar at the split and positively engage the outer perimeter of the collar with the inner race of the bearing thereby to non-rotatably secure the inner race, the shaft and the collar.

4. The bearing assembly as defined in claim 3, wherein the collar has a circular inner perimeter to receive the elongated rod.

5. The bearing assembly as defined in claim 3, wherein the collar has a rectangular inner perimeter to receive the elongated rod.

6. The bearing assembly as defined in claim 3, including two generally radial pilot holes located near the split and disposed in a pair on opposite sides thereof to allow for symmetrical expansion of the collar with respect to the shaft.

7. The bearing assembly as defined in claim 6, in which there are provided four set screws in two pairs disposed at respective ends of the collar adjacent to but displaced slightly from the bearing when positioned centrally on the collar.

8. A method of installing an elongated rod carrying a plurality of toothed sleeves onto a ground working implement having a tool bar with a plurality of supports depending therefrom, each support having an upper end attached to the tool bar and a lower end carrying a bearing, the bearings on the plurality of supports being substantially laterally aligned, the method comprising the steps of:

sliding a first end of the elongated rod through a first bearing;

sliding a first split collar over the elongated rod for concentric placement between the first bearing and the elongated rod;

sliding a predetermined number of the toothed sleeves onto the elongated rod;

aligning the first end of the elongated rod with a second bearing and inserting the first end through the second bearing;

sliding a second split collar over the. elongated rod for concentric placement between the second bearing and the elongated rod; and threadably tightening set screws into pilot holes within the first and second split collars to expand the collars and secure the elongated rod to the bearings.

9. The method as defined according to claim 8, wherein a third support with a third bearing is accommodated by including, immediately before the threadably tightening step, the following intermediate steps of:

sliding an additional predetermined number of the toothed sleeves onto the elongated rod;

aligning the first end of the elongated rod with a the third bearing and inserting the first end through the third bearing; and sliding a third split collar over the elongated rod for concentric placement between the third bearing and the elongated rod.

10. A bearing assembly for rotatably supporting an elongated rod of a ground working implement, said bearing assembly comprising a housing, a bearing having an inner and an outer race, the inner race being located within and rotatable relative to said housing, a collar telescoped into said inner race and having a longitudinally extending split, and means engageable with said rod for securing said collar for rotation with said rod while forcibly expanding said collar outwardly into non-rotatable engagement with said inner race.

* * * * *